United States Patent Office 2,708,200
Patented May 10, 1955

2,708,200

PENTAERYTHRITE DIHALOHYDRIN MONO-SULFUROUS ACID ESTERS

Helmut Pietsch and Horstmar Nagel, Dusseldorf, Germany, assignors to Henkel & Cie. G. m. b. H., Dusseldorf, Germany, a corporation of Germany No Drawing. Application August 5, 1952,
Serial No. 302,834

Claims priority, application Germany August 23, 1951

6 Claims. (Cl. 260—327)

This invention relates to pentaerythrite derivatives.

One object of this invention is the production of pentaerythrite dihalohydrin monosulfurous acid esters. This, and still further objects will become apparent from the following description:

In accordance with the invention, a pentaerythrite dihalohydrin, the halogen being selected from the group of chlorine or bromine, is reacted with thionyl chloride and a pentaerythrite dihalohydrin monosulfurous acid ester having the following formula is recovered:

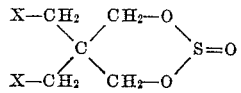

wherein X is an halogen atom of the group of chlorine and bromine.

In accordance with one embodiment of the invention, the X is a chlorine atom, and the ester is pentaerythrite dichlorohydrin monosulfurous acid ester. The pentaerythrite dihalohydrin which is reacted with the thionyl chloride is pentaerythrite dichlorohydrin.

In accordance with another embodiment of the invention, the X represents a bromine atom and the ester produced is pentaerythrite dibromohydrin monosulfurous acid ester. The pentaerythrite dihalohydrin which is reacted with the thionyl chloride is pentaerythrite dibromohydrin.

The pentaerythrite dichlorohydrin or dibromohydrin which is used as a starting material in accordance with the invention, may be prepared in the known manner by reacting pentaerythrite with hydrogen chloride or hydrogen bromide, respectively, and isolating the resulting dichlorohydrin or dibromohydrin. The preparation of pentaerythrite dichlorohydrin or pentaerythrite dibromohydrin is reported by Fecht, Berichte der deutschen chemischen Gesellschaft, Band 40, Seite 3888/89, Jahrgang 1907 and Zelinski, Berichte der deutschen chemischen Gesellschaft, Band 46, Seite 162/163, Jahrgang 1913.

The reaction of the dichlorohydin or dibromohydrin with thionyl chloride in accordance with the invention may be effected at relatively low temperatures. The reaction is carried out by merely mixing approximately equal molecular amounts of the reactants, and may, if desired, be accelerated and completed by heating the mixture to a temperature of about 100° C.

The reaction is preferably effected within a temperature range of about 0° to 100° C. At temperatures below 0° C., as, for example, at —5° C., the reaction will proceed, though much slower.

The completion of the reaction is indicated by the termination of the evolution of hydrogen chloride.

Reaction may be effected in the presence of inert solvents, as, for example, benzene, toluene, xylene, pentane, hexane, and other aliphatic hydrocarbons, diethylether, dibutylether, acetone and methyl-ethyl-ketone. As the reaction occurs in an excellent manner in absence of solvents, the latter serve merely as diluents to decrease the speed of reaction. Due to the high reactivity of the reactants, the amount of solvents used is unimportant. Therefore, the ratio by weight of solvent to weight of reactants may vary within wide limits, and may for example, vary from 0 to 50, and preferably from 0 to 20.

After the reaction is complete, the rest of thionylchloride—if any—and the rest of hydrogen chloride may be removed as, for example, by washing with water, by a stream of air or similar methods. The crude ester will remain and will be of sufficient purity for many technical purposes. The ester may very easily be obtained in a purer form by means of vacuum distillation, crystallization or combined purification method. When the sulfurous ester is purified by crystallization, by vacuum distillation or by both methods, the prior removal of the hydrogen chloride is not necessary, since it is removed by crystallization or distillation.

The pentaerythrite dibromohydrin monosulfurous ester produced in accordance with the invention is a new compound. It contains, such as the pentaerythrite dichlorohydrin monosulfurous ester, two ester groups of different reactivity within the molecule, and therefore is a very valuable intermediate product for organic synthesis. The sulfurous ester group may more easily be split off than the halogen atoms. Therefore, it is possible to allow these two ester groups to react separately and in this manner to build up new organic compounds. In addition, the ester groups may be very easily split off by alkaline reagents. By the utilization of this property, 2:6 dioxaspiro 3:3 heptane, as well as other compounds that contain one or two oxacyclobutane rings per molecule, may be obtained for the production of valuable artificial resins. The formation of oxacyclobutane derivatives is described in our copending application Serial No. 297,982.

The following examples are given by way of illustration and not limitation:

Example 1

173 gr. of pulverized pentaerythrite dichlorohydrin are added in portions to 119 gr. of thionyl chloride, the mixture being kept at about 20° C. A vigorous evolution of gas occurs and the dichlorohydrin passes almost completely into solution. The mixture is then slowly heated to steam bath temperature, whereby the remainder of the pentaerythrite dichlorohydrin dissolves and is maintained at that temperature until the gas evolution is ended. The resulting solution may be vacuum-distilled, the monosulfurous acid ester of the pentaerythrite dichlorohydrin passing over at B. P.=113–115° C. Alternatively, the distillation may be omitted, the reaction product separating out, washed with cold water, and then recrystallized from absolute or dilute alcohol. The pure ester melts at 30° C.

Example 2

43 gr. of pentaerythrite dichlorohydrin are dissolved in 300 ccs. of benzene and the solution maintained at 20° C. while 30 gr. of thionyl chloride are added slowly with stirring until the reaction is complete. After distilling off the benzene, the sulfurous acid ester of pentaerythrite dichlorohydrin remains behind in quantitative yield.

Example 3

13 gr. (about 1/20 mol.) of pentaerythrite dibromohydrin are added to 6 gr. (about 1/20 mol.) of thionyl chloride, and the mixture stirred. Hydrogen chloride is vigorously evolved and the mixture heated on a water bath until no more bubbles are generated in the resultant clear yellowish oily liquid. The reaction product which separates out is the sulfurous acid ester of pentaerythrite dibromohydrin which may be recrystallized from a little alcohol and has a melting point of 45° C.

We claim:

1. Method for the preparation of pentaerythrite derivatives, which comprises contacting a pentaerythrite dihalohydrin, the halogen being a member selected from the group consisting of chlorine and bromine, with thionyl chloride and recovering a pentaerythrite dihalohydrin monosulfurous acid ester having the general formula

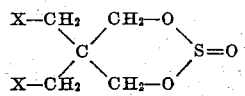

in which X is a halogen atom of the group of chlorine and bromine.

2. Process according to claim 1, in which said dihalohydrin is pentaerythrite dichlorohydrin and in which X is a chlorine atom.

3. Process according to claim 1, in which said dihalohydrin is pentaerythrite dibromohydrin, and in which X is bromine.

4. Process according to claim 1, in which said contacting is effected in the presence of an inert solvent.

5. Process according to claim 1, in which said contacting is effected at a temperature of about 0°–100° C.

6. As a new chemical compound, a pentaerythrite dihalohydrin monosulfurous acid ester selected from the group consisting of pentaerythrite dichlorohydrin monosulfurous acid ester and pentaerythrite dibromohydrin monosulfurous acid ester.

References Cited in the file of this patent

UNITED STATES PATENTS 2,471,274   Lingo _____ May 24, 1949

OTHER REFERENCES

Orthner: Berichte 61:116–118 (1928).
Webster's International Dictionary, p. 1194 (1939 ed.).